United States Patent Office 2,889,144
Patented June 2, 1959

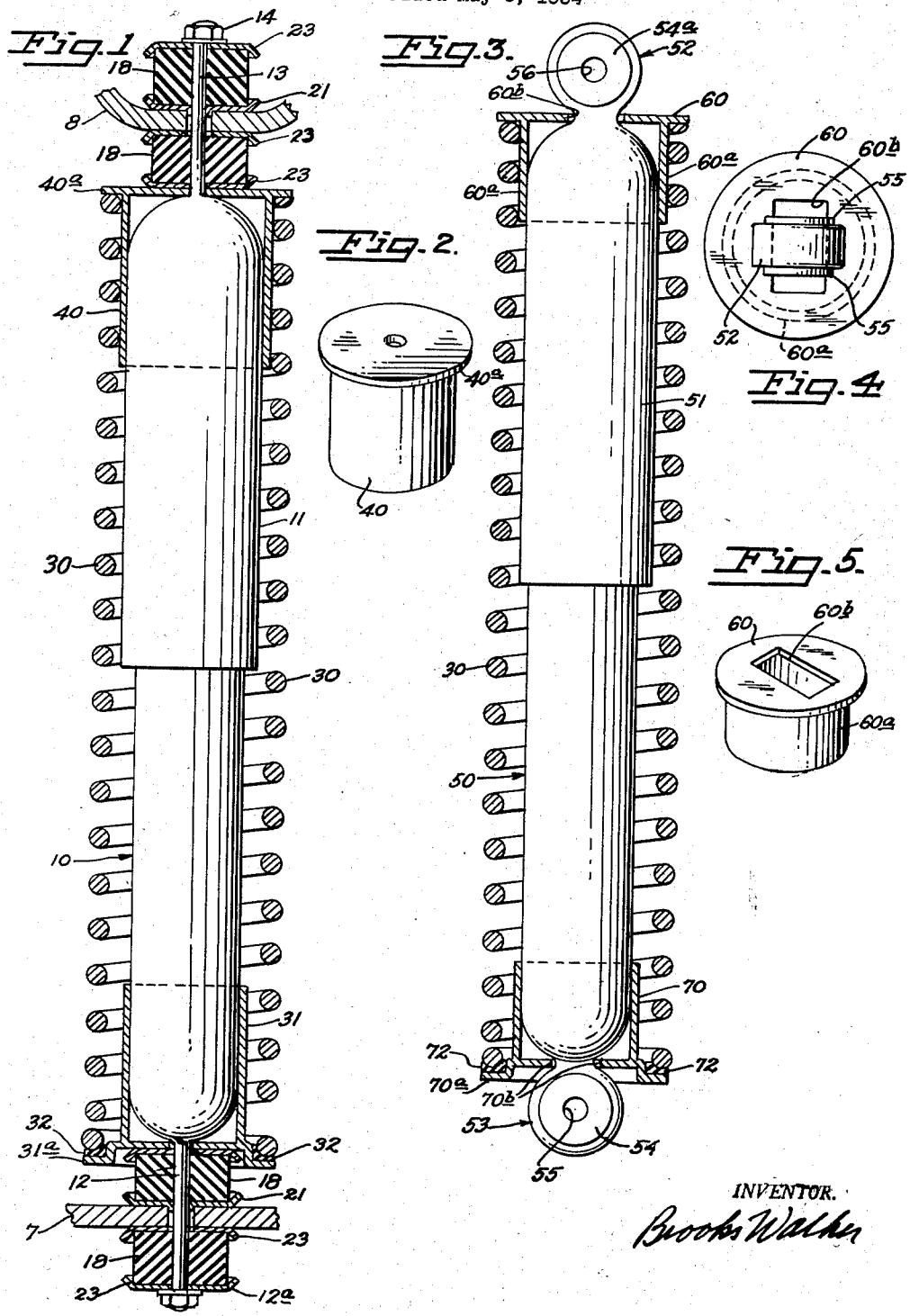

2,889,144

SPRING ADAPTERS FOR SHOCK ABSORBERS

Brooks Walker, Piedmont, Calif.

Application May 6, 1954, Serial No. 427,927

10 Claims. (Cl. 267—8)

This invention pertains to improvements in overload springs, shock absorbers, and the like.

Previously overload springs have been cumbersome items secured to the vehicle body, axles, or main support springs. They usually were noisy in operation and were hard to mount. Springs on the outside of telescoping shock absorbers have been shown in my copending United States patent applications Serial No. 394,244 and Serial No. 394,245, now abandoned. However, the adapters shown in these applications were not nested over the shock absorber as shown in this application and therefore not as secure or aligned a base for the spring which they support or contact as the body aligned adapters shown in applicant's present invention. This shock absorber body aligned base for the springs is a feature of this invention.

Another feature of this invention is to provide an adapter that can be readily applied to shock absorbers of the telescoping type, as used on many of the automobiles as currently manufactured in the United States, without the necessity of modifying the shock absorbers or their mountings. Most present shock absorbers have bolt or eye ends, and the adapters shown in this invention fit either the bolt or eye end and are secured to the shock absorber in alignment therewith by one model of adapter nesting around the body of the shock absorber at one end and another model adapter nests around the rock guard at the other end of the shock absorber. Where shock absorbers have eye ends the adapters are constructed to pass over the eyes, turn ninety degrees or a part revolution, and be capable of then taking a heavy spring load by the spring on the outside of the shock absorber which butts against the adapters at each end of the shock absorber. Other objects of the invention will be more particularly pointed out in the accompanying specifications and claims.

I have illustrated my invention by way of example in the accompanying figures, in which, Fig. 1 is a side elevation, partly cut away, showing one form of the invention.

Fig. 2 is a perspective view of one of the spring adapters shown in Fig. 1.

Fig. 3 is a side elevation, partly in section, showing another form of the invention.

Fig. 4 is a top plan view of the construction shown in Fig. 3.

Fig. 5 is a perspective view of the spring adapter shown in the construction illustrated in Fig. 3.

In Figs. 1 and 2, I have illustrated a main shock absorber body 10 of the telescoping hydraulic type with a rock guard or shield 11 and bolt-type ends 12 and 13. Rubbers 18 are mounted on bolts 12 and 13 and nested between centering washers 21 and retaining washers 23 on both sides of the supporting bracket 8 at the top of the shock absorber, usually attached to a vehicle frame or chassis, and 7 at the lower end of the shock absorber, usually attached to the vehicle axle, or wheel support structure. Spring adapters 40 at the top end of the shock absorber nest closely over the rock guard portion 11 so that the flange 40a which receives the end of auxiliary spring 30 has a base which is at right angles to the length of the shock absorber 10. A slightly smaller adapter 31 is nested closely to the body of the shock absorber 10 and has a stepped flange 31a on which is a rubber or neoprene inclined washer 32 to provide a non-metallic contact between the spring 30 and the stepped flange 31. This may be necessary where under certain operations the spring 30 separates from the adapter 31 when the shock absorber is fully extended. The spring 30 preferably hugs the adapter 40 closely so that it is retained by adapter 40 in case of a separation of adapter flange 31a from the lower end of spring 30 during certain extension operations of the shock absorber. By this construction both adapter 40 and adapter 31 provide a firm base with parallel ends during the operation of the shock absorber to provide a satisfactory base for the spring during its compression and load carrying operation. Unless the adapter is rigidly aligned with the shock absorber the spring may tend to jack-knife or cause more noise than with squarely aligned ends. It can also be seen that the adapters, as provided in this construction, can be readily applied to existing shock absorbers without changing the shock absorbers or the mounting of said shock absorbers, so that by a fairly simple operation of removing the shock absorbers, applying the adapters on the spring, and reinstalling the shock absorbers, auxiliary spring suspension is provided for the vehicle for such uses as towing trailers, carrying overloads, etc.

In Figs. 3, 4, and 5, I have shown a main shock absorber 50, with ring-type ends 53 and 52, in which are mounted rubber bolt adapters 54 and 54a of the usual type. Holes 55 and 56 are provided for receiving the mounting bolts in a conventional manner with the bolt going in hole 56 being mounted to the vehicle body or frame in the usual construction and bolt that goes in hole 55 being attached to the vehicle axle or vehicle wheel supporting frame. Spring 30 is nested between adapter 60 at the top end of the shock absorber which has a top plate with a rectangular slot 60b adapted to pass over ring 52 and then to be turned ninety degrees, as shown in Figs. 3 and 4, so that it can take a heavy load of compression from spring 30 between the smaller width of the rectangular hole 60b and the outside diameter of ring 52. A sleeve 60a nests on the outside of rock guard 51 to squarely align the adapter 60 with the axis of the shock absorber and provide the flange on which spring 60 may rest squarely and securely. Adapter 70 has a sleeve which nests around the body of the shock absorber 50, a stepped flange 70a to receive the lower end of spring 30, and a rubber or neoprene-like non-metallic washer 72 to cushion any contact the lower end of spring 30 and the stepped flange 70a, as in Fig. 1. During certain operations of the shock absorber when the shock absorber is fully extended, the lower end of the spring 30 may separate from the said flange 70a, and a non-metallic contact may be desirable. A rectangular opening 70b is adapted to pass ring 53 through its long axis and when turned ninety degrees to form a load-carrying shoulder on the opposite sides of its narrower slot to receive the load of spring 30. From this construction it can be seen that by removing the bolt from both ends of the shock absorber and possibly removing the rubber bushings which may extend beyond the two adapters an overload spring may be readily applied to the shock absorber, the rubber reinserted, and the shock absorber remounted on the car in a minimum of time and effort to provide a ready means of applying an overload spring to a conventional type shock absorber.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. The combination of: a vehicle shock absorber of the telescoping type with a main body having at its outer end a first ring member for mounting said body on said vehicle and with a rock guard into which a portion of said body telescopes, the outer end of said rock guard having a second ring member for mounting it on said vehicle; and an overload spring installed on said shock absorber and comprising a pair of adapters, each having a sleeve portion, one mounted around said rock guard and one mounted around said body portion, each adapter having a radial flange portion and an end wall portion provided with an opening adapted to pass over its associated said ring member, and a portion engaging said ring member after being passed thereover and turned approximately ninety degrees, said engaging portion thereby comprising means to prevent relative lengthwise movement between one said adapter and said rock guard and between the other said adapter and said body portion; and a coil spring mounted coaxially around said adapter sleeve portions, said rock guard, and said body, each end of said spring being seated against a said adapter flange.

2. The overload spring assembly of claim 1, wherein said opening through said adapter is an elongated slot being barely longer than the outer diameter of said ring and barely wider than the thickness of said ring.

3. The combination of: a vehicle shock absorber of the telescoping type with a main body having at its outer end a first annular eye for mounting said body on said vehicle and with a rock guard into which a portion of said body telescopes, the outer end of said rock guard having a second annular eye for mounting it on said vehicle; and an overload spring assembly comprising a pair of adapters each having a sleeve portion mounted respectively around said body portion and said rock guard and each having a radial flange portion, and each having an outer end wall closed except for a rectangular opening therethrough, the length of said rectangular openings being slightly greater than the respective outer diameters of said eyes, and the width of said rectangular opening being slightly greater than the thickness of said eye, and less than the respective outer diameters of said body and said rock guard, whereby said spring and said adapters are slipped over said mounting eyes into position, said adapters when turned approximately ninety degrees locking between said shock absorber and said mounting against relative lengthwise movement; and a coil spring mounted coaxially around said adapter sleeve portions, said rock guard, and said body, the ends of said spring being seated against said adapter flanges.

4. The combination with a vehicle shock absorber of the telescoping type having a main body with means on its outer end for mounting said body on said vehicle and a rock guard into which a portion of said body telescopes, the outer end of said rock guard being imperforate and having means of smaller diameter in at least one direction than said rock guard for mounting said rock guard on said vehicle, said rock guard mounting means comprising a ring member secured to said rock guard, of an overload spring assembly adapted for installation on an already-installed said shock absorber and comprising an adapter having a sleeve portion mounted around said rock guard and having a radial flange portion, said adapter also having an end wall portion with a generally rectangular opening therethrough smaller than the diameter of said rock guard but large enough to pass over said ring member, said end wall portion abutting with one face against said rock guard, said end wall portion engaging said ring member after being passed thereover and turned approximately ninety degrees, said engaging portion thereby being locked between said rock guard and said ring member; comprising a coil spring mounted coaxially around said adapter sleeve portion, said rock guard, and said body, one end of said spring being seated against said adapter flange; and means adjacent said outer end of said body engaging the opposite end of said spring.

5. The combination of claim 4, wherein said rectangular opening through said adapter end wall is an elongated slot being barely longer than the outer diameter of said ring member and barely wider than the thickness of said ring member.

6. The combination with a vehicle shock absorber of the telescoping type having a main body with means on its outer end for mounting said body on said vehicle and a rock guard into which a portion of said body telescopes, the outer end of said rock guard being imperforate and having means of smaller diameter in at least one direction than said rock guard for mounting said rock guard on said vehicle; of an overload spring assembly adapted for installation on an already-installed said shock absorber and comprising an adapter having a sleeve portion mounted around said rock guard and having a radial flange portion, said adapter also having an end wall portion with an opening therethrough smaller than the diameter of said rock guard but large enough to pass over said rock-guard mounting means, said end wall portion abutting with one face against said rock guard; means engaging the other face of said end wall to prevent relative lengthwise movement between said adapter and said rock guard; a coil spring mounted coaxially around said adapter sleeve portion, said rock guard, and said body, one end of said spring being seated against said adapter flange; and means adjacent said outer end of said body engaging the opposite end of said spring comprising a second adapter having a sleeve portion engaging the outer periphery of said body and a radial flange portion at its outer end engaging said spring end, said second adapter having a dished end wall portion substantially in line with said flange with an opening in said dished end wall portion, said opening being adapted to pass over said main body mounting means and serving to guide said second adapter by contact with said mounting means, said second adapter end wall portion opening being smaller than said body portion, each said adapter end wall opening being rectangular and each said mounting means comprising an annular eye, the length of each said rectangular opening being slightly greater than the outer diameter of said eye, and the width of said rectangular opening being slightly greater than the thickness of said eye and less than the diameter of said body and of said rock guard, whereby said spring and said adapters are slipped over said mounting eyes into position, said adapters when turned approximately ninety degrees locking between said shock absorber and said mounting against relative lengthwise movement.

7. A yieldable load-carrying device for a vehicle having a sprung portion and an unsprung portion and an hydraulic-type shock absorber interposed and connected between said sprung and unsprung portions, said shock absorber having a cylinder body portion and a piston-and-rod portion movable relative to each other, said shock absorber having mounting means extending from each outer end and being smaller in at least one dimension than said cylinder body portion, and resilient means associated with each said mounting means for transmitting forces between said shock absorber and said sprung and unsprung portions respectively, even under conditions of limited misalignment between said shock absorber and said sprung and unsprung portions; said load-carrying device comprising a coil spring mounted coaxially around said shock absorber; bearing means for one end of said spring adjacent the mounting means at the piston-and-rod end of said shock absorber, and a removable adapter comprising a sleeve that slidably fits around a portion of the exterior of said cylinder body portion and terminates at one end at a substantial axial distance from the outer end of said cylinder body portion and at its other end axially closely adjacent to said mounting means, said adapter having a substantially planar end wall located between the end of the cylinder body portion and the resilient means, and an opening in the end wall through which the mounting means extends, a radially extending flange on the adapter against which the corresponding end of the spring bears, said flange being located at the other end of the adapter and adjacent to the free end of the cylinder body portion, said adapter transmitting axial load-supporting force from said unsprung portion through said spring and through its adjacent resilient means to the sprung portion.

8. A yieldable load-carrying device as claimed in claim 7 in which the opening in the end wall of the adapter is round and the mounting means extending from at least the outer end of the cylinder body portion being a cylindrical bolt passing through the opening.

9. A yieldable load-carrying device for a vehicle having a sprung portion and an unsprung portion and an hydraulic-type shock absorber interposed and connected between said sprung and unsprung portions, said shock absorber having a cylinder body portion and a piston-and-rod portion movable relative to each other, said piston-and-rod portion being connected to a generally cylindrical dust guard cover that is telescopically mounted with respect to said cylinder body portion, mounting means extending from the opposite ends and being narrower in at least one dimension than said cylinder body portion, and resilient means associated with each said mounting means for transmitting forces between said shock absorber and said sprung and unsprung portions respectively, even under conditions of limited misalignment between said shock absorber and said sprung and unsprung portions; said load-carrying device comprising: a coil spring mounted coaxially around said shock absorber; and a removable adapter at each of the opposite ends of said shock absorber, each having a sleeve portion, one fitting slidably around the exterior of said cylinder body portion and the other fitting slidably around the exterior of said dust guard and extending a substantial axial distance along them from their ends, each said adapter having a substantially planar end wall located between the corresponding end of the shock absorber and the resilient means, and an opening in each end wall through which the mounting means extends, a flange on each adapter against which the ends of the spring bear, each said flange being located adjacent to an end of the shock absorber, the load-supporting force of said spring acting on load from said unsprung portion and being transmitted through one said resilient means, through one said mounting means, and one said adapter to said spring and thence through the other said adapter, the other said mounting means, and the other said resilient means to said sprung portion, and without transmitting axial force through said reduced end portions.

10. The combination of claim 9, wherein each said adapter end wall has a round opening and wherein each said mounting means comprises a bolt extending through said opening and washers on said bolts between the respective said adapter end walls, and resilient mounting means.

References Cited in the file of this patent

UNITED STATES PATENTS

| | | | |
|---|---|---|---|
| 1,745,357 | Crowell | | Feb. 4, 1930 |
| 2,344,896 | Phelps | | Mar. 21, 1944 |
| 2,621,919 | Utz | | Dec. 16, 1952 |

FOREIGN PATENTS

| | | | |
|---|---|---|---|
| 422,686 | Great Britain | | Jan. 16, 1935 |
| 455,841 | Great Britain | | Oct. 28, 1936 |
| 565,630 | Great Britain | | Nov. 20, 1944 |
| 1,044,393 | France | | June 17, 1953 |
| 1,059,988 | France | | Nov. 18, 1953 |